United States Patent
Ehara

Patent Number: 5,414,753
Date of Patent: May 9, 1995

[54] NUMBER ASSIGNMENT MODULE SETTING SYSTEM FOR PORTABLE TELEPHONE SET

[75] Inventor: Tatsuji Ehara, Tokyo, Japan

[73] Assignee: NEC Corporation, Tokyo, Japan

[21] Appl. No.: 94,431

[22] Filed: Jul. 21, 1993

[30] Foreign Application Priority Data

Jul. 30, 1992 [JP] Japan .................. 4-204135

[51] Int. Cl.6 ............................... H04Q 7/32
[52] U.S. Cl. ........................ 379/58; 379/59; 380/23
[58] Field of Search ........ 379/58, 59, 61, 62; 340/825.34; 380/23

[56] References Cited

U.S. PATENT DOCUMENTS

| | | | |
|---|---|---|---|
| 4,799,061 | 1/1989 | Abraham et al. | 340/825.34 |
| 4,935,962 | 6/1990 | Austin | 340/825.34 |
| 5,062,132 | 10/1991 | Yasuda | 379/62 |
| 5,109,152 | 4/1992 | Takagi et al. | 340/825.34 |
| 5,196,840 | 3/1993 | Leith et al. | 340/825.34 |
| 5,233,656 | 8/1993 | Langrand et al. | |

FOREIGN PATENT DOCUMENTS 2249923 5/1992 United Kingdom .

Primary Examiner—Curtis Kuntz
Assistant Examiner—Dwayne D. Bost
Attorney, Agent, or Firm—Young & Thompson

[57] ABSTRACT

In a number assignment module setting system for a portable telephone set, a portable telephone set inputs number assignment module in a number assignment module setting mode. A number assignment module setting adapter is connected to the telephone set to set the telephone set in the number assignment module setting mode. In the portable telephone set, a detecting section detects connection of the adapter. A first data supply section supplies first data to the adapter in response to a predetermined first key input when connection of the adapter is detected. An analyzing section receives second data formed by the adapter on the basis of the first data, and performs analysis to check whether the first data can be calculated back from the second data. A mode setting section sets the number assignment module setting mode in response to a predetermined second key input when an output from the analyzing section indicates that the first data can be calculated back from the second data. In the number assignment module setting adapter, a second data supply section forms the second data from the first data received from the telephone set by a predetermined calculation method, and supplies it to the telephone set.

5 Claims, 2 Drawing Sheets

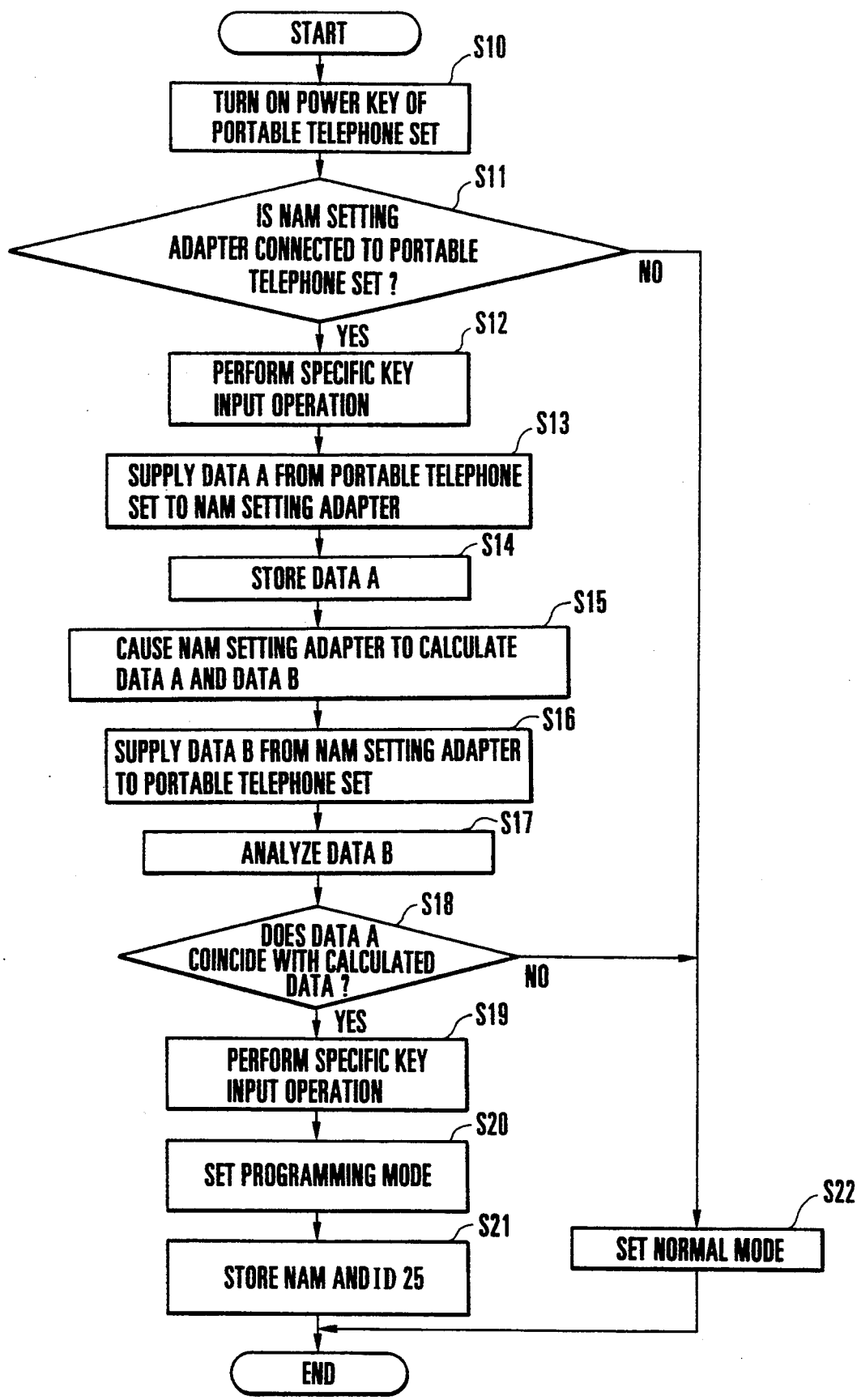
F I G. 2

NUMBER ASSIGNMENT MODULE SETTING SYSTEM FOR PORTABLE TELEPHONE SET

BACKGROUND OF THE INVENTION

The present invention relates to a number assignment module setting system for a portable telephone set using a number assignment module adapter and, more particularly, to setting of a mode for inputting a number assignment module.

The number assignment module (to be referred to as NAM hereinafter) of a portable telephone set will be described first. The NAM is information, such as the telephone number, country code, password, and the like of a portable telephone set, required to use the portable telephone set. In general, when a NAM is to be written in a portable telephone set, a NAM setting adapter is connected to the portable telephone set, and the portable telephone set is set in a special mode (to be referred to as a programming mode hereinafter) different from a normal operation mode. A mode setting method of setting a portable telephone set in the programming mode will be described below. Note that a NAM is set by using the NAM adapter because it is required that a NAM setting operation be performed by maintenance personnel but not by an end user.

A conventional programming mode setting operation of a portable telephone set will be described next. In the conventional programming mode setting method, a NAM setting adapter is connected to a portable telephone set, which has a function of setting a NAM in cooperation with the NAM setting adapter, through an I/O interface section, a connector, and a cable. The power key is then depressed to supply power from the portable telephone set. In this case, the NAM setting adapter connected to the portable telephone set outputs 1-byte mode request data for requesting a shift to the programming mode to the portable telephone set.

As described above, the conventional NAM setting adapter has a function of outputting pre-stored 1-byte mode request data upon reception of power through the portable telephone set. Upon reception of the 1-byte data from the I/O interface section immediately after the power key is turned on, the portable telephone set performs collation/analysis to check whether the 1-byte data is mode request data from the NAM setting adapter. If the 1-byte data coincides with the mode request data, a predetermined specific key input operation is subsequently performed to shift the portable telephone set to the programming mode. A NAM can be set by operating the keys of the portable telephone set only in this programming mode.

The conventional portable telephone set also has a function of prohibiting a shift to the programming mode even by performing the specific key input operation if the 1-byte data, received immediately after the power is turned on, does not coincide with the mode request data for requesting a shift to the programming mode, or if no data is received when the power key of the portable telephone set is turned on.

In the above-described conventional number assignment module setting system for a portable telephone set, the NAM setting adapter outputs 1-byte data to the portable telephone set upon reception of power through the portable telephone set. The portable telephone set performs collation/analysis to check whether the 1-byte data is mode request data for requesting a shift to the programming mode. If the two data coincide with each other, a predetermined specific key input operation is performed by using the portable telephone set. For this reason, if an end user illegally obtains or copies the NAM setting adapter, the telephone number and the password can be arbitrarily rewritten, thus allowing illegal use of the portable telephone set.

SUMMARY OF THE INVENTION

It is an object of the present invention to provide a number assignment module setting system for a portable telephone set, which can prevent illegal setting of a number assignment module in the portable telephone set.

In order to achieve the above object, according to the present invention, there is provided a number assignment module setting system for a portable telephone set, comprising a portable telephone set for inputting a number assignment module in a number assignment module setting mode, and a number assignment module setting adapter connected to the portable telephone set to set the portable telephone set in the number assignment module setting mode, the portable telephone set including detection means for detecting connection of the number assignment module setting adapter, first data supply means for supplying first data to the number assignment module setting adapter in response to a predetermined first key input when an output from the detection means indicates that the number assignment module setting adapter is connected, analyzing means for receiving second data formed by the number assignment module setting adapter on the basis of the first data, and performing analysis to check whether the first data can be calculated back from the second data, and mode setting means for setting the number assignment module setting mode in response to a predetermined second key input when an output from the analyzing means indicates that the first data can be calculated back from the second data, and the number assignment module setting adapter including second data supply means for forming the second data from the first data received from the portable telephone set by a predetermined calculation method, and supplying the second data to the portable telephone set.

BRIEF DESCRIPTION OF THE DRAWINGS

FIG. 2 is a flow chart showing a programming mode setting sequence in the number assignment module setting system in FIG. 1.

DESCRIPTION OF THE PREFERRED EMBODIMENT

Figure 1:
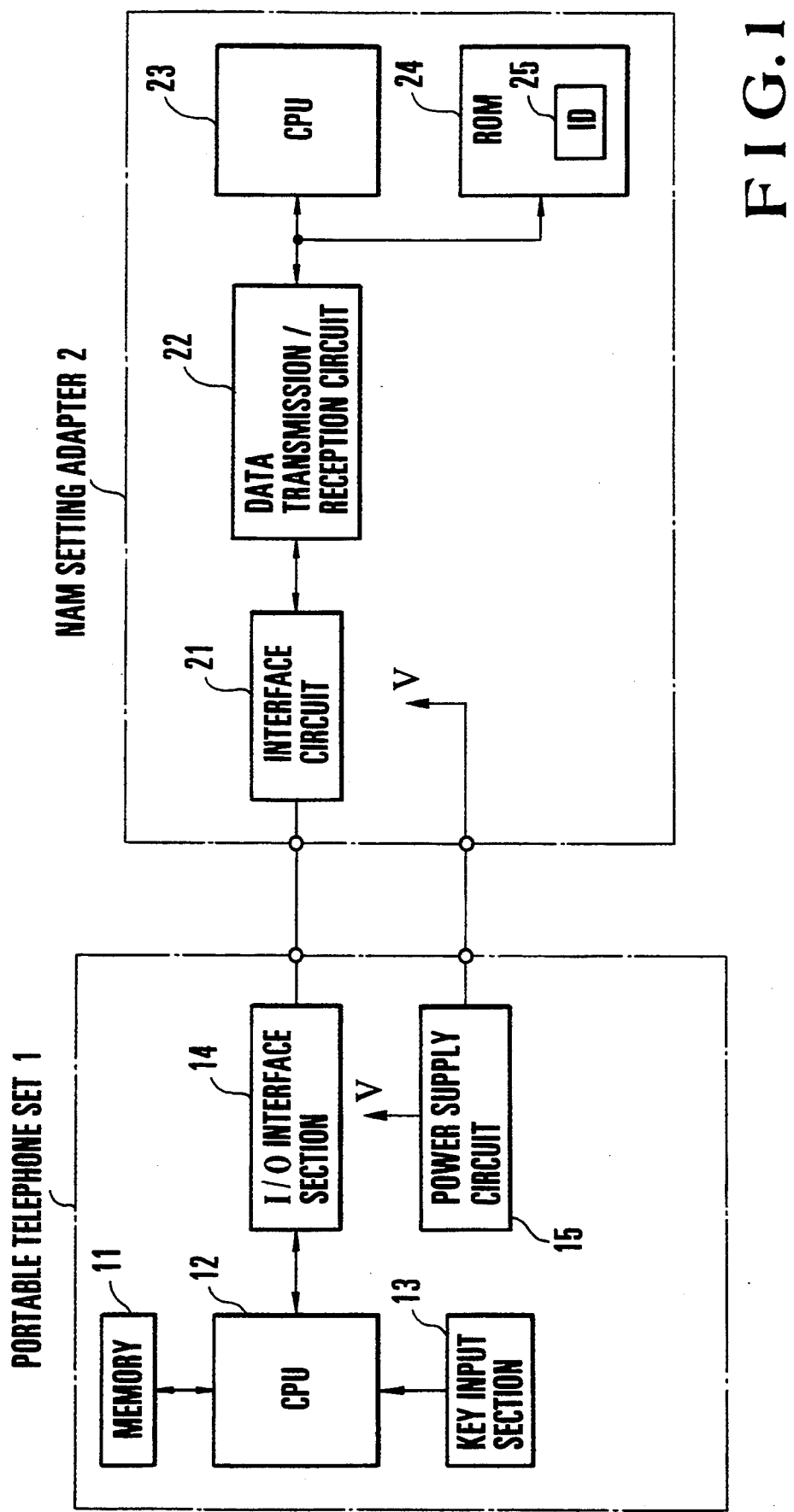
FIG. 1 is a block diagram showing a number assignment module setting system for a portable telephone set according to an embodiment of the present invention.

A number assignment module setting system for a portable telephone set according to the present invention will be described below with reference to the accompanying drawings. FIG. 1 shows an embodiment of the number assignment module setting system for the portable telephone set according to the present invention. Referring to FIG. 1, the number assignment module setting system is constituted by a portable telephone set 1 for setting a number assignment module and a NAM (number assignment module) setting adapter 2 connected to the portable telephone set 1 only when a number assignment module is to be set.

The portable telephone set 1 comprises an I/O interface section 14 for interfacing with the NAM setting adapter 2, a key input section 13 for inputting a dial number, NAM setting data, and the like, a memory 11 for storing the set NAM and allowing it to be read out in a telephone operation, a CPU (Central Processing Unit) 12 for controlling the overall portable telephone set 1, i.e., a NAM setting operation including a telephone operation and a programming mode setting operation, and a power supply circuit 15 for supplying power to each component of the portable telephone set 1 and the NAM setting adapter 2.

The NAM setting adapter 2 comprises an interface circuit 21 for interfacing with the I/O interface section 14 of the portable telephone set 1, a data transmission/reception circuit 22 for exchanging data with the portable telephone set 1 through the interface circuit 21, a ROM (Read-Only Memory) 24 for storing programs for a data transmitting/receiving operation and a scrambling operation, and a CPU 23 for controlling the overall NAM setting adapter 2, i.e., performing a control operation based on the programs stored in the ROM 24. The NAM setting adapter 2 is connected to the portable telephone set 1 through a connector and a cable only in a NAM setting operation. Note that power to the NAM setting adapter 2 is supplied from the power supply circuit 15 through an independent power line. However, the power may be superposed on a signal line between the I/O interface section 14 and the interface circuit 21. Alternatively, a power supply circuit may be arranged as a local circuit.

The ROM 24 of the NAM setting adapter 2 stores ID 25 in advance. ID 25 is a parameter used to scramble data from the NAM setting adapter 2 to the portable telephone set 1 and also serves as the management number of the NAM setting adapter 2 itself, which number is predetermined in one portable telephone system and is used to manage one or more portable telephone sets 1. In this embodiment, the CPU 23 and the ROM 24 of the NAM setting adapter 2 are indicated by different blocks. However, since the NAM setting adapter 2 has its own management number, a one-time PROM or a CPU incorporating an EEPROM may be used as the CPU 23, and a unique management number may be written in the PROM. With this arrangement, illegal rewriting of ID 25 can be prevented.

A programming mode setting sequence will be described next with reference to the flow chart shown in FIG. 2. By connecting the NAM setting adapter 2 to the portable telephone set 1, in which a NAM is to be set, through a cable or the like, the I/O interface section 14 is electrically connected to the interface circuit 21. The power key (not shown) of the portable telephone set 1 is depressed to supply power to the portable telephone set 1 and the NAM setting adapter 2 (step S10). In this case, the CPU 12 of the portable telephone set 1 performs a data transmitting/receiving operation through the I/O interface section 14 to check whether the NAM setting adapter 2 is connected (step S11). In this case, a switch or sensor for detecting connection of the NAM setting adapter 2 to the connector in a hardware manner may be independently arranged as a means for detecting connection of the NAM setting adapter 2.

If it is determined in step S11 that the NAM setting adapter 2 is connected, a predetermined specific key input operation is performed by using the key input section 13 of the portable telephone set 1 (step S12).

With this key input operation, the CPU 12 of the portable telephone set 1 outputs randomly generated data A through the I/O interface section 14, and the CPU 23 of the NAM setting adapter 2 receives the data A through the interface circuit 21 and the data transmission/reception circuit 22 (step S13). At the same time, the CPU 12 of the portable telephone set 1 temporarily stores the data A in the memory 11 (step S14).

The CPU 23 of the NAM setting adapter 2 calculates data B from the received data A by a specific calculation method using ID 25 stored in the ROM 24 as a parameter (step S15). The CPU 23 outputs the calculated data B to the portable telephone set 1 (step S16). In this case, the data B contains ID 25 scrambled by a predetermined specific calculation method. Upon reception of the data B, the CPU 12 of the portable telephone set 1 analyzes the data B using a predetermined specific calculation method and calculates back to the data A and ID 25 as a parameter (step S17). If the obtained data coincides with the data A stored in the memory 11, it is determined that the authentic NAM setting adapter 2 is connected (step S18).

If YES in step S18, and a predetermined specific key input operation is performed at the key input section 13 of the portable telephone set 1 (step S19), the CPU 12 sets the portable telephone set 1 in the programming mode (step S20). The NAM information is set in the portable telephone set 1 by using the key input section 13 only when the portable telephone set 1 is set in the programming mode. When the NAM is set, the CPU 12 of the portable telephone set 1 stores the NAM information in the memory 11 together with ID 25 calculated back (step S21). ID 25 also serves as the management number of the NAM setting adapter 2. Therefore, by storing ID 25, a history of NAM setting in the portable telephone set 1 through a specific NAM setting adapter 2 can be known.

If it is determined in step S11 that the NAM setting adapter 2 is not connected to the portable telephone set 1, or it is determined in step S18 that the data A calculated back by the portable telephone set 1 does not coincide with the stored data A, a shift to the programming mode does not occur, and the normal mode is set (step S22) even if the specific key operation is performed in step S12 or S19.

As has been described above, according to the present invention, an arithmetic function of performing software processing is added to a conventional NAM setting adapter having only a function of transmitting a mode request signal by means of hardware. With this new function, the illegal manufacture of NAM setting adapters can be almost prevented. In addition, since data to be exchanged between a portable telephone set and a NAM setting adapter is scrambled, it is difficult to analyze data between the portable telephone set and the NAM setting adapter, thus preventing the illegal manufacture of NAM setting adapters more effectively and also preventing illegal setting of an arbitrary NAM in the portable telephone set. Furthermore, since the management number of a NAM setting adapter is analyzed by a portable telephone set which performs a NAM setting operation, a history of setting of NAM in the portable telephone set through a specific NAM setting adapter can be managed.

What is claimed is:

1. A number assignment module setting system for a portable telephone set, comprising:

a portable telephone set for inputting a number assignment module in a number assignment module setting mode; and a number assignment module setting adapter connected to said portable telephone set to set said portable telephone set in the number assignment module setting mode, said portable telephone set including main power supply means for supplying power within the portable telephone set, first data supply means for supplying first data to said number assignment module setting adapter in response to a predetermined first key input, analyzing means for receiving second data formed by said number assignment module setting adapter on the basis of the first data, and performing analysis to check whether the first data can be calculated back from the second data, and mode setting means for setting the number assignment module setting mode in response to a predetermined second key input when an output from said analyzing means indicates that the first data can be calculated back from the second data, and said number assignment module setting adapter including local power supply means for supplying power to the number assignment module setting adapter by the power supplied from the main power supply means, second data supply means for forming the second data from the first data received from said portable telephone set by a predetermined calculation method using pre-stored third data as a parameter, and supplying the second data to said portable telephone set, first memory means for storing the third data as a self-management number, said analyzing means calculates back to the first and third data from the second data by a predetermined second calculation method, and connectors and cables for interconnecting the portable telephone set to the number assignment module setting adapter.

2. A system according to claim 1, wherein said portable telephone set comprises second memory means for storing the third data, calculated back by said analyzing means, together with set number assignment module, said third data being stored in said second memory means so as to keep a history of the number assignment module adapter therein.

3. A system according to claim 1, wherein said portable telephone set comprises storage means for temporarily storing the first data randomly generated and supplied from said first data supply means to said number assignment module setting adapter, so that said analyzing means compares contents stored in said storage means with an analysis result.

4. A system according to claim 1, wherein the first memory means preliminarily stores the third data and a setting program, said second data supply means includes a central processing unit for controlling the data supply based on the setting program.

5. A system according to claim 1, wherein the portable telephone set further includes detection means for detecting connection of said number assignment module setting adapter, and said first data supply means supplying said first data to said number assignment module setting adapter in response to a predetermined first key input, when an output from said detection means indicates that said number assignment module setting adapter is connected.

* * * * *